United States Patent [19]

Thompson

[11] Patent Number: 5,109,476
[45] Date of Patent: Apr. 28, 1992

[54] COLOR PRINTER WITH SYNCHRONOUS AND ASYNCHRONOUS STAGES

[75] Inventor: John R. Thompson, Webster, N.Y.

[73] Assignee: Eastman Kodak Company, Rochester, N.Y.

[21] Appl. No.: 597,138

[22] Filed: Oct. 15, 1990

[51] Int. Cl.$^5$ .......................................... G06K 15/00
[52] U.S. Cl. ..................................... 395/105; 395/112
[58] Field of Search ................................ 364/518–520, 364/930 MS, 235 MS; 346/154, 160, 157; 358/296, 300; 400/119

[56] References Cited

U.S. PATENT DOCUMENTS

| | | | |
|---|---|---|---|
| 3,508,002 | 5/1966 | Hauer | 179/2 |
| 4,578,689 | 3/1986 | Spencer et al. | 346/160 |
| 4,739,352 | 4/1988 | Gorelick et al. | 354/6 |
| 4,803,517 | 2/1989 | Bruce, Jr. | 355/3 CH |
| 4,837,589 | 6/1989 | Dodge | 346/108 |
| 4,900,130 | 2/1990 | Haas | 350/321 |
| 4,907,034 | 3/1990 | Doi et al. | 355/327 |

FOREIGN PATENT DOCUMENTS 1201624 8/1970 United Kingdom .
1202617 8/1970 United Kingdom .

Primary Examiner—Arthur G. Evans
Attorney, Agent, or Firm—Milton S. Sales

[57] ABSTRACT

A printer includes a RIP for converting a received stream of image instructions into electrical image signals and a hybrid marking engine with at least one stage operable in an asynchronous mode, wherein a page can be processed in portions, and at least one stage restricted to synchronous operation, wherein the synchronous stage runs at a predetermined fixed speed during its entire processing of a page. The marking engine may be electrostatographic device having an asynchronous writer stage and a synchronous development stage, transfer stage, or fusing stage. The transfer stage may operate asynchronously from the developer such that there is an indeterminate time period between the development operation and the transfer operation.

16 Claims, 4 Drawing Sheets

COLOR PRINTER WITH SYNCHRONOUS AND ASYNCHRONOUS STAGES

BACKGROUND OF THE INVENTION

1. Technical Field

This invention relates generally to printers for creating pages by a complex page description language, and more particularly to such a printer which is adapted to create pages using complex page description language but which does not require full page buffer memory.

2. Background Art

An all points addressable marking engine, such as a laser, ink jet, or dot matrix printer, is capable of placing a mark at any one of a large number of pixel locations on a page. Many such marking engines are such that once a page is in process, the marking engine must continue to operate at a predetermined, fixed speed until the page is completed. This referred to herein as a "synchronous" mode of operation. Electrostatographic printers are examples of marking engines which require synchronous operation, at least for the latent image development and transfer portions of the electrographic process.

Typically, a printer includes a marking engine and a controller which receives an electronically encoded stream of text and graphics instructions from an external source and generates a signal for controlling the marking engine. Since such marking engines often function to mark one line of pixels at a time, in raster fashion, the controller is commonly referred to as a raster image processor, or RIP.

A raster image processor generally includes both (1) a microprocessor for control and data manipulation and (2) a font memory for storing bit maps of alphanumeric characters and graphic objects for the microprocessor. The raster image processor typically creates pages by a complex page-description language rendering algorithm which forms a bit map of, for example, "1"s to indicate that a mark is to be made at the corresponding location on the page, or "0"s to indicate that the location is to be left blank. In operation, the raster image processor receives a code such as ASCII code indicating a character and the location where it is to be printed, and retrieves a bit map representation of the indicated character from the font memory.

A rasterizing process as described above is generally slow when compared to the speed of known marking engines. If the marking engine is one which requires synchronous operation as described above, a buffer must be provided between the raster image processor and the marking engine so that a full page of bit map data is available when the marking engine starts a new page; or at least so that enough data is available to insure that the marking engine will not have to wait for additional data in mid-page.

The memory buffer contains a memory location for each location on the page where a mark can be made by the marking engine. The processor then stores the bit map in the desired location in the page memory. When the page memory has been filled in this fashion, the contents of the memory are addressed, one line at a time, to drive the marking engine.

DISCLOSURE OF INVENTION

It is an object of the present invention to provide a printer wherein a marking engine which requires synchronous operation can operate in conjunction with a slower raster image processor, even in the absence of an intermediate buffer between the raster image processor and the marking engine.

According to the present invention, a printer which includes means for converting a received stream of image instructions into electrical image signals has a hybrid marking engine with at least one stage operable in an asynchronous mode, wherein a page can be processed in portions, and at least one stage restricted to synchronous operation, wherein the synchronous stage runs at a predetermined fixed speed during its entire processing of a page. A buffer, such as a line store or stores, may be provided for storing less than a full page of electrical image signals before being applied to the asynchronous stage of the marking engine.

In a preferred embodiment of the printer, the hybrid marking engine is an electrostatographic device having a writer stage operable in an asynchronous mode wherein an electrostatic image of a page can be processed in portions, and at least one stage restricted to synchronous operation wherein the stage runs at a predetermined, fixed speed during its entire processing of a page. The synchrononous stage may include any one of, or combinations of, means for developing the electrostatic image of an entire page in one, continuous operation, means for transferring a developed electrostatic image of an entire page to a receiver sheet in one, continuous operation, and means for fixing a transferred developed image of an entire page in one, continuous operation. The transferring means may operate asynchronously from the developing means such that there is an indeterminate time period between the developmemt operation and the transfer operation.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
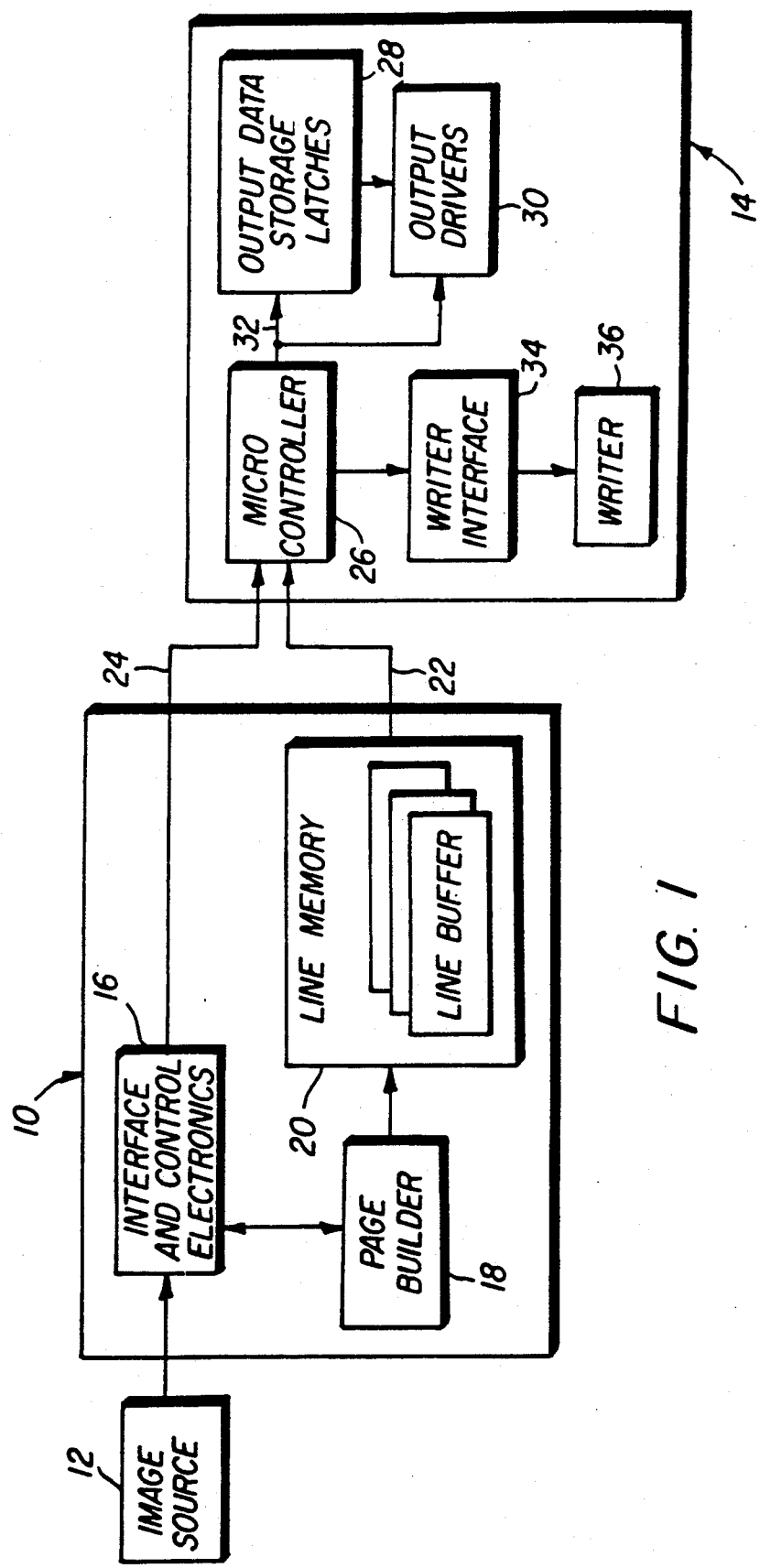
FIG. 1 is schematic block diagram of a printer according to the present invention.

Referring to FIG. 1, a raster image processor 10 receives a file of page generation instructions from an image source 12, such as a mainframe computer, personal computer, graphics work station, image scanner, or optical character recognition device. A display list created from the generation instructions, and the raster image processor generates bit map data from the display list for driving an all points addressable marking engine 14. As will be explained, the marking engine is capable of receiving writing in a asynchronous mode and marking the written data visible (developing) in a synchronous mode.

Raster image processor 10 includes interface and control electronics 16 that controls the overall operation of the processor and provides interfaces with image source 12 and marking engine 14. Interface and control electronics 16 may comprise a programmed microprocessor as is well known in the art.

A page builder 18 receives instructions from interface and control electronics 16 and generates bit map print data representing graphic objects and alphanumeric characters. The bit map representation for one or more lines are accumulated and stored in line memory 20 prior to sending the printing instructions to marking engine 14. As explained below, the data need not be in raster order if the marking engine is capable of operating as a plotter to create the image in a random location order. In this case, it would only be necessary to process the display list using a series of band buffers, which could be as narrow as one line.

Marking engine 14 receives bit stream image data over a bus 22 and job control data over a communications link 24. Control means, including a micro controller 26 is arranged to perform arithmetic and logic operations and instruction decoding, and to provide timing and cycle control signals directly or through storage latches 28 to suitable output drivers 30 connected to marking engine subsystems. After appropriate processing, the data is inputted to a writer interface 34 and a writer 36 for forming images on the receiver sheets.

Many types of marking engines involve processes which must run continuously once the first line has begun to be printed. Once begun, all data for the entire page must be guaranteed to be available on demand. For example, the electrophotographic process requires that a latent image of a page be developed continuously, and that a developed image be transferred to a receiver sheet in one, continuous operation.

For any conventional system more complicated than a simple text printer, the requirement for synchronous operation necessitates a full page buffer between the raster image processor and the marking engine to guarantee availability of the data on demand. For even moderate speed printers, this implies that the buffer be made from Random Access Memory, since current disk drives (both optical and magnetic) are too slow and, in general, can not provide an uninterrupted data stream due to cylinder and sector seek times.

Figure 2:
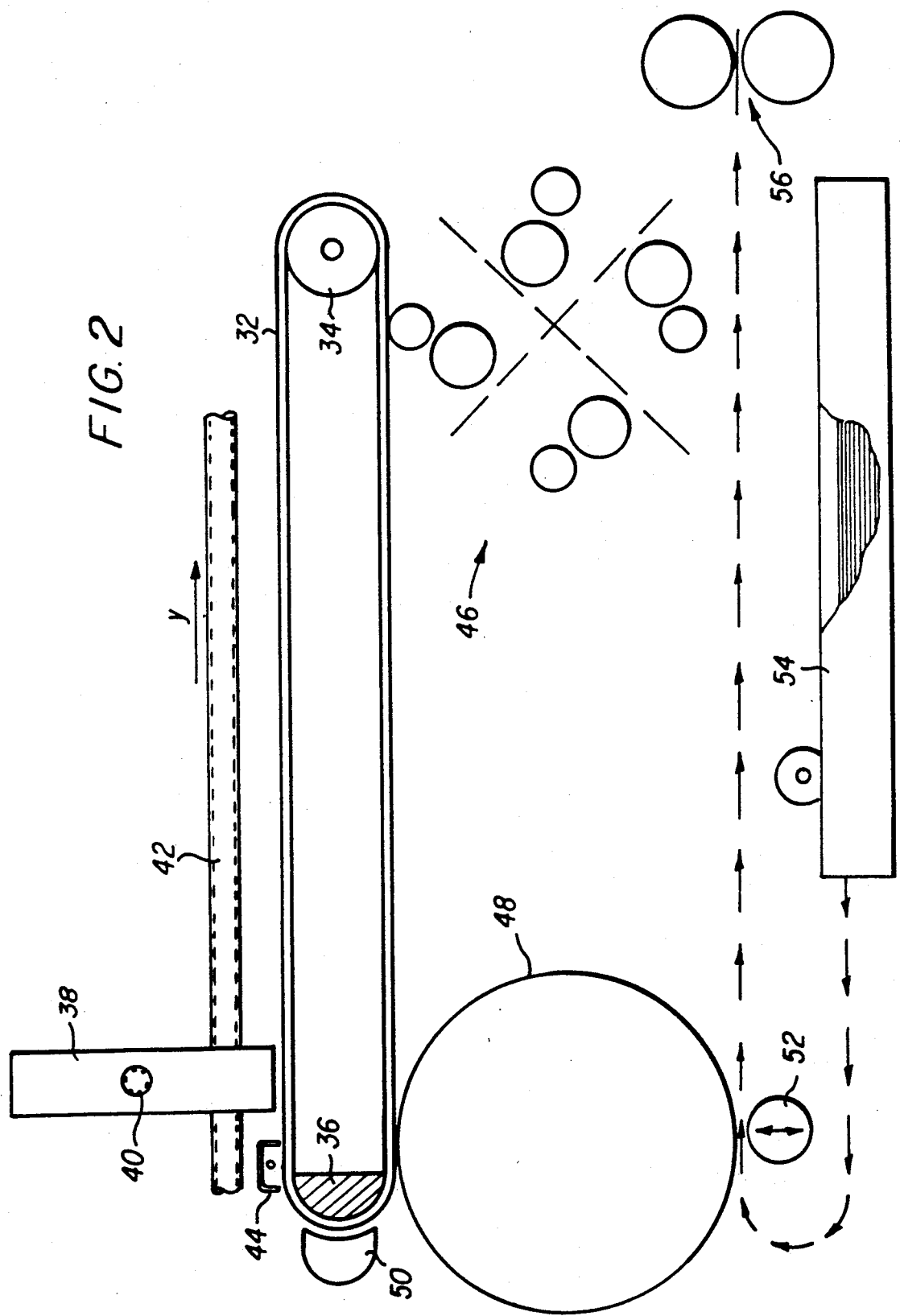
FIG. 2 is a front elevational view of an electrophotographic marking engine in cross-section, and with portions broken away or removed to facilitate viewing.

FIG. 2 shows an electrophotographic marking engine. A photoconductive belt 32 is supported on a roller 34 and a slider 36 for intermittent intrack movement in a clockwise direction as shown. Belt 32 may be of conventional composite structure such as described in U.S. Pat. No. 3,615,414 to Light.

A linear array of light sources such as LED's, optical fibers, etc. is carried by a write head 38. The array extends in an intrack direction parallel to the direction of motion of the photoconductive belt.

Figure 3:
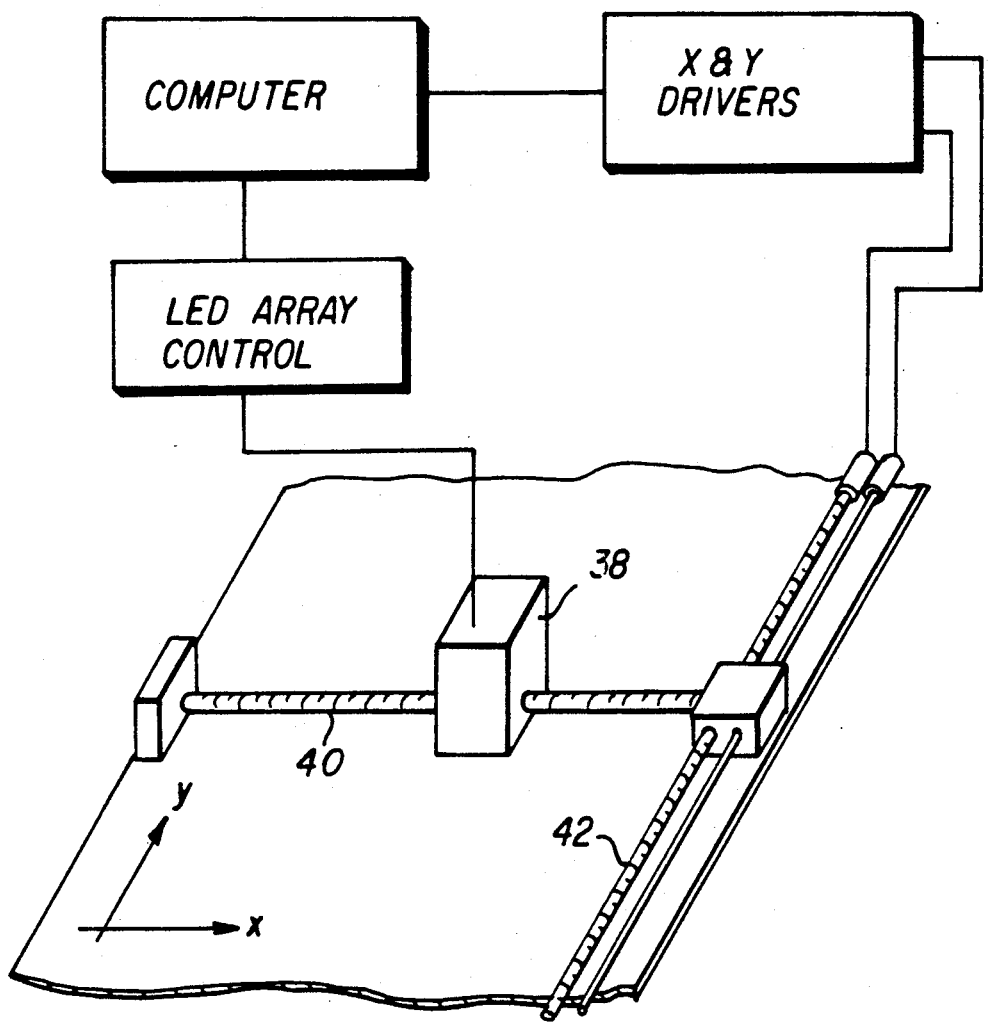
FIG. 3 is a top plan view schematically showing operation of the writer portion of the marking engine of FIG. 2.

Referring also to FIG. 3, write head 38 is slidably mounted on glide rails 40 and 42 for movement in "x" (crosstrack) and "y" (intrack) directions. Movement of the write head along the rails is accomplished by a drive assembly schematically shown in FIG. 3 as lead screws and motors.

In preparation for writng a page of data to an image frame of photoconductive belt 32, the belt is advanced one-half its length past a charger station 44 (FIG. 2). The charger station includes a primary corona charger located upstream of write head 38 and extends for substantially the full width of photoconductive belt 32 in the crosstrack direction transverse to the direction of movement of the belt. The charger is selectively energized by a power supply source, not shown, to provide for placement of a uniform electrostatic charge on the photoconductive belt as the belt moves under the charger.

When photoconductive belt 32 stops, a serial train of signals from raster image processor 10 is fed to the marking engine to cause print head 38 to begin a crosstrack pass over photoconductive belt 32 while various of the light sources in the intrack array are turned on and off for the desired exposure of a band of data across the belt.

After a pass of the print head across the belt, a host computer communicates with the apparatus to activate the intrack drive for the print head, stepping the head in the direction of travel of the photoconductive belt by an amount equal to the length of the light source array.

Now the print head is ready for another pass across the photoconductive belt. However, since the write operation may take less time than is required for raster image processor 10 to prepare the data for a band, it is likely that the marking engine will have to wait at the end of many, or all, write head passes across the belt. The asynchronous ability to stop after each scan has the important advantage of eliminating the need for large page buffer memories. Since the marking engine can wait for the buffer memory to catch up, magnetic or optical disk buffers can be used. Such memories are from ten to twenty times less expensive than Random Access Memories, and are frequently present in computer systems.

As explained above, the data need not be in raster order if the marking engine is capable of operating as a plotter. That is, if the exposure can be effected in a random location order.

When all of the image information for a page has been exposed onto an image frame of photoconductive belt 32, the belt is advanced clockwise, as illustrated, one-half its length. The just-exposed latent image advances past a multi-color development station 46, in which one color magnetic brush developer is activated to tone the latent image. The toner image advances to the bottom of the belt loop, and the belt stops with a newly charged frame on top ready for exposure.

The toner image is now parked between development station 46 and the nip of a transfer roller 48. After exposure of its next image frame, photoconductive belt 32 is again advanced one-half its length, whereupon the parked toner image is transferred to transfer roller 48 and the just-exposed frame is developed and parked at the bottom of the belt loop. Once the toner image is transferred from an image frame of belt 32, the image frame is cleaned at a station 50, charged by charger 44, and returned to the top of the belt loop for the next exposure cycle. The process is repeated for each color separation, up to the number of different color development stations (four in the illustrated example), until all color separations have been transferred in overlying position onto transfer roller 48.

Once all of the color separation toner images have been transferred in superposed relation to transfer roller 48, a second nip roller 52 is closed, a receiver sheet is fed from a supply 54, and the multi-color toner image is transferred to the receiver sheet at nip 52. The receiver sheet and transferred toner image is fed through a fuser 56.

Figure 4:
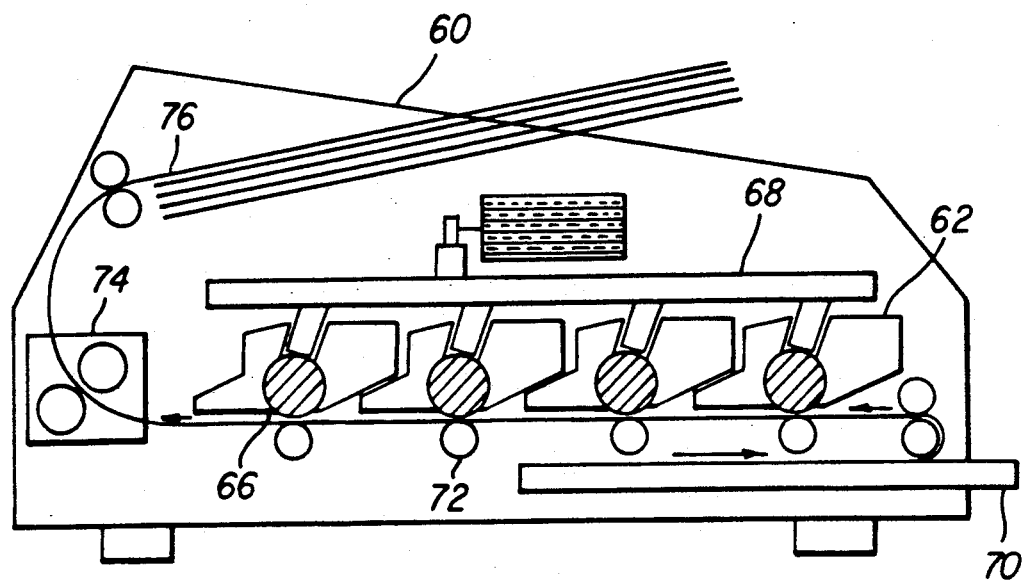
FIGS. 4 and 5 illustrate a second embodiment of a four-color marking engine 60 in accordance with the present invention.
Figure 5:
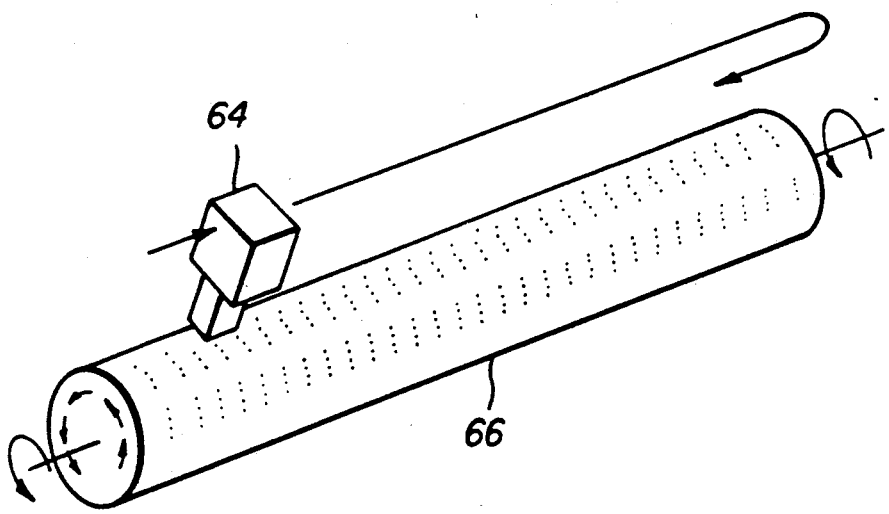

FIGS. 4 and 5 illustrate a second embodiment of a four-color marking engine 60 in accordance with the present invention. Four cartridges similar to cartridge 62 contain four different colored toner development stations. Four small printheads such as printhead 64, each with an intrack linear array of L.E.D. elements are moved axially along four photosensitive drums such as drum 66 to each write one band of data. The printheads are interconnected by a drive mechanism 68 to move in unison.

After each band of data is written, the photosensitive drums are indexed to present a new surface for writing. The time interval between indexes is varied as necessary by the data processing from the raster image processor. This procedure of writing and indexing is continued until the page of file is finished and all data for a particular file is transmitted to the marking engine from the raster image processor.

A paper supply 70 holds a number of receiver sheets. Single sheets are fed from the paper supply and passed between four transfer rollers such as roller 72 and the photosensitive drums so that each components color toner image is transferred to the receiver sheet. The receiver sheet then passes through a fuser 74 where the image is fixed. After leaving the fuser, the receiver sheet is fed onto a receiving platform 76.

The invention has been described in detail with particular reference to preferred embodiments thereof, but it will be understood that variations and modifications can be effected within the spirit and scope of the invention.

What is claimed is:

1. A printer adapted to produce printed pages from received electronically encoded stream of image instructions, said printer comprising:
   means for converting a received stream of image instructions into electrical image signals;
   a hybrid marking engine having:
      at least one stage operable in an asynchronous mode wherein a page can be non-continuously processed in portions, and
      at least one stage restricted to synchronous operation wherein the stage runs at a predetermined, continuous fixed speed during its entire processing of a page; and
   means for applying the image signals to the asynchronous mode stage of the marking engine.

2. A printer as defined in claim 1 wherein:
   the printer is adapted to receive the electronically encoded image instructions as page description language input signals; and
   said converting means is adapted to convert page description language input signals into a rasterized stream of electrical image signals.

3. A printer as defined in claim 2 wherein said converting means is adapted to convert page description language input signals into a rasterized stream of electrical image signals by a complex page-description language rendering algorithm which forms a bit map and which requires more time to process a page than is required for the synchronous stage to process a page.

4. A printer as defined in claim 1 wherein said signal applying means comprises buffer means for storing less than a full page of electrical image signals produced by said converting means before being applied to said asynchronous stage of the marking engine.

5. A printer as defined in claim 4 wherein said buffer means is at least one line store.

6. A printer as defined in claim 1 wherein:
   said stage operable in an asynchronous mode write data; and
   said stage restricted to synchronous operation makes the written data visible.

7. A printer adapted to produce printed pages from received electronically encoded stream of image instructions, said printer comprising:
   means for converting a received stream of image instructions into electrical image signals;
   a hybrid electrostatographic marking engine having:
      a writer stage operable in an asynchronous mode wherein an electrostatic image of a page can be non-continuously processed in portions, and
      at least one stage restricted to synchronous operation wherein the stage runs at a predetermined, continuous fixed speed during its entire processing of a page; and
   means for applying the image signals to the writer stage of the marking engine.

8. A printer as defined in claim 7 wherein said synchronous stage includes means for developing the electrostatic image of an entire page in one, continuous operation.

9. A printer as defined in claim 7 further comprising means for developing the electrostatic image and wherein said synchronous stage includes means for transferring a developed electrostatic image of an entire page to a receiver sheet in one, continuous operation.

10. A printer as defined in claim 7 further comprising means for developing the electrostatic image and transferring the developed electrostatic image to a receiver sheet and wherein said synchronous stage includes means for fixing a transferred developed image of an entire page in one, continuous operation.

11. A printer as defined in claim 7 wherein said synchronous stage includes:
   means for developing the electrostatic image of an entire page in one, continuous operation; and
   means for transferring a developed electrostatic image of an entire page to a receiver sheet in one, continuous operation.

12. A printer as defined in claim 11 wherein said transferring means operates asynchronously from said developing means such that there is an indeterminate time period between the development operation and the transfer operation.

13. A hybrid marking engine adapted to produce printed pages from a received stream of electrical image signals; said marking engine comprising:
   at least one stage operable in an asynchronous mode wherein a page can be non-continuously processed in portions: and
   at least one stage restricted to synchronous operation wherein the stage runs at a predetermined, continuous fixed speed during its entire processing of a page.

14. A hybrid marking engine as defined in claim 13 wherein:
   the marking engine is an electrostatographic device;
   the asynchronous stage is a writer, wherein an electrostatic image of a page can be processed in portions, and the synchronous stage includes means for developing the electrostatic image of an entire page in one, continuous operation.

15. A hybrid marking engine as defined in claim 13 wherein:

the marking engine is an electrostatographic device;

the asynchronous stage is a writer, wherein an electrostatic image of a page can be processed in portions, and the synchronous stage includes means for transferring a developed electrostatic image of an entire page to a receiver sheet in one, continuous operation.

16. A hybrid marking engine as defined in claim 13 wherein:

the marking engine is an electrostatographic device;

the asynchronous stage is a writer, wherein an electrostatic image of a page can be processed in portions, and the synchronous stage includes includes means for fixing a developed and transferred image of an entire page in one, continuous operation.

* * * * *